US012087505B2

(12) United States Patent
Neff et al.

(10) Patent No.: US 12,087,505 B2
(45) Date of Patent: Sep. 10, 2024

(54) LOW-COST LINEAR ACTUATOR HAVING A MOVING PRINTED COIL ASSEMBLY DEFINED ON A PRINTED CIRCUIT BOARD

(71) Applicant: Systems, Machines, Automation Components Corporation, Carlsbad, CA (US)

(72) Inventors: Edward A. Neff, Carlsbad, CA (US); Toan Minh Vu, San Diego, CA (US)

(73) Assignee: Systems, Machines, Automation Components Corporation, Carlsbad, CA (US)

(*) Notice: Subject to any disclaimer, the term of this patent is extended or adjusted under 35 U.S.C. 154(b) by 0 days.

(21) Appl. No.: 18/054,092

(22) Filed: Nov. 9, 2022

(65) Prior Publication Data

US 2023/0197324 A1 Jun. 22, 2023

Related U.S. Application Data

(60) Provisional application No. 63/277,444, filed on Nov. 9, 2021.

(51) Int. Cl.

| | |
|---|---|
| ***H01F 7/16*** | (2006.01) |
| ***H01F 7/08*** | (2006.01) |
| ***H01F 7/121*** | (2006.01) |
| ***H01F 41/00*** | (2006.01) |

(52) U.S. Cl.

CPC ............... *H01F 7/16* (2013.01); *H01F 7/081* (2013.01); *H01F 7/121* (2013.01); *H01F 41/00* (2013.01)

(58) Field of Classification Search

CPC . H01F 7/16; H01F 7/081; H01F 7/121; H01F 41/00; H01F 7/122; H01F 2007/068; H01F 7/066

USPC .......................................................... 335/282

See application file for complete search history.

(56) References Cited

U.S. PATENT DOCUMENTS 5,155,399 A * 10/1992 Zimmermann ....... H02P 25/034 335/282
5,351,934 A * 10/1994 Jensen .................. H01F 7/1615 335/229
5,821,841 A * 10/1998 Furlani ................. H01F 7/1615 335/282
2010/0179464 A1* 7/2010 Smith ................... F16K 31/082 604/6.1
2020/0259406 A1* 8/2020 Neff ....................... H02K 5/225

* cited by examiner

*Primary Examiner* — Shawki S Ismail
*Assistant Examiner* — Lisa N Homza
(74) *Attorney, Agent, or Firm* — Cooley LLP

(57) ABSTRACT

A linear actuator includes a magnet housing having first and second planar sides, a front plate and a rear plate, and a base plate covering a channel defined by the magnet housing. A first plurality of magnets is secured to the first planar side and a second plurality of magnets is secured to the second planar side. A linear guide slidably secured to an inner surface of the base plate. A piston assembly has a piston element attached to the linear guide. The piston assembly includes a shaft and a printed circuit board attached to the piston element. The printed circuit board defines a controller and a printed coil assembly. A flex cable is electrically connected to the printed circuit board. The piston assembly is disposed to move linearly during operation of the linear actuator.

6 Claims, 19 Drawing Sheets

LOW-COST LINEAR ACTUATOR HAVING A MOVING PRINTED COIL ASSEMBLY DEFINED ON A PRINTED CIRCUIT BOARD

CROSS REFERENCE TO RELATED APPLICATIONS

This application claims priority to and the benefit of U.S. Provisional Patent Application No. 63/277,444, entitled LOW-COST LINEAR ACTUATOR HAVING A MOVING PRINTED COIL ASSEMBLY DEFINED ON A PRINTED CIRCUIT BOARD, filed on Nov. 9, 2021, the disclosure of which is incorporated herein by reference in its entirety for all purposes.

FIELD

The present disclosure relates generally to actuators and, more particularly, to linear actuators having moving coils.

BACKGROUND

Linear actuators are mechanical devices which are used to perform repetitive actions requiring linear motion. For example, linear actuators can be used in an assembly plant for placing caps on bottles, for automatically stamping or labeling mail, for glass cutting, for placing electronic components on printed circuit boards, for testing various buttons or touch areas on electronic devices, for automation, and for a wide variety of other purposes as well.

Historically, enterprises involved in the automated assembly of devices have utilized pneumatic actuators to manipulate the parts for such devices. A typical pneumatic actuator or other pneumatic system will generally include an air cylinder, valve, flow controls, position switches, tubing, and a compressor. Pneumatic systems are usually low cost (e.g., in the range of $150 to $200), but have various disadvantages: For example, although pneumatic systems are generally inexpensive, pneumatic systems such as actuators are known to have a somewhat limited lifetime, and may sometimes last less than 10M cycles. Moreover, pneumatic systems are often noisy, must be manually adjusted, and have cycle rate limitations (e.g., less than 1000 CPM).

In contrast, moving coil linear motors typically have higher cycle rates (>2000CPM) and enjoy a longer lifetime (e.g., 100M cycles or more) than pneumatic systems. In addition, moving coil linear motors operate relatively quietly. The position, speed, and force of moving coil linear motors may also be programmably adjusted. Unfortunately, currently available moving coil linear motors include a number of costly components that have made them substantially more expensive than air cylinders. These components include, for example, wound coils, separate linear encoders, expensive controllers, and milled housings. Moreover, the need to manually assemble at least part of moving coil linear motors (e.g., to manually wind coils on bobbins) has further contributed to the cost of moving coil linear motors being substantially more than that of pneumatic actuator systems. This cost structure has limited the ability of moving coil actuators to replace air cylinders.

SUMMARY

Disclosed herein are various configurations of a low-cost, moving coil linear actuator that includes a printed coil assembly defined on one or more multi-layer printed circuit boards disposed within a laser-cut magnet housing. Through the use of innovative low cost components such as printed coils with integrated encoders and controllers, and "industrial Origami" designed laser parts that have virtually no tool up cost and can be made in quantity approximately 20 times faster than milled parts, the disclosed moving coil electric actuator may advantageously be manufactured cost competitively with pneumatic devices yet offer higher performance. The low cost design is characterized by the use of printed coils with an integrated encoder read head, and a magnet housing and piston realized through laser cutting and bending of steel plating. This enables machined parts to be produced in high volume using commercially available laser cutting machines. A built-in controller capable of being disposed on the piston eliminates the need for connecting wiring (e.g., a flex cable). The resulting actuator can cycle approximately twice as fast as air cylinders and last up to ten times longer.

The disclosure is directed to various linear actuator configurations manifesting some or all of these advantages and efficiencies. One such linear actuator configuration includes an actuator housing in the form of a magnet housing. The magnet housing includes first and second planar sides, and a front plate and a rear plate respectively arranged at a front end and a rear end of the magnet housing. A base plate covers a channel defined by the magnet housing, the channel extending between the front end and the rear end of the magnet housing. The linear actuator further includes a first plurality of magnets secured to the first planar side and a second plurality of magnets secured to the second plane side. A linear guide is slidably secured to an inner surface of the base plate. A piston assembly includes a piston element attached to the linear guide, the piston assembly being positioned at least partially within the channel. The piston assembly includes a shaft extending from the piston element and a multi-layer printed circuit board attached to the piston element. The multi-layer printed circuit board defines a controller and a printed coil assembly. The printed coil assembly includes a plurality of printed coils where ones of the printed coils are positioned between the first plurality of magnets and the second plurality of magnets during operation of the linear actuator. A flex cable is electrically connected to the printed circuit board.

The printed coils of the multi-layer printed circuit may each include multiple coil traces where each of the multiple coil traces are printed on a respective one of multiple layers of the multi-layer printed circuit board.

The disclosure also pertains to a linear actuator including an actuator housing made up of at least a magnet housing, A first plurality of magnets is secured to a first side surface of the magnet housing. A second plurality of magnets is secured to a second side surface of the magnet housing substantially parallel to the first surface. A linear guide is slidably secured to an inner surface of a base plate of the actuator housing. A piston assembly having a piston element is attached to the linear guide and positioned at least partially within the actuator housing. The piston assembly includes a shaft extending from the piston element and a multi-layer printed circuit board attached to the piston element. The multi-layer printed circuit board defines a controller and a printed coil assembly. The printed coil assembly includes a plurality of printed coils where ones of the printed coils are positioned between the first plurality of magnets and the second plurality of magnets during operation of the linear actuator. A flex cable is electrically connected to the printed circuit board.

In another aspect the disclosure concerns a linear actuator including a housing structure having a magnet housing configured to define a channel. A base plate is secured to the magnet housing and a linear guide is attached to the base plate. A piston assembly includes a shaft and a piston element attached to the linear guide. The piston assembly further includes a multi-layer printed circuit board defining multi-layer printed coils, a controller, and an encoder read head.

In yet another aspect the disclosure relates to a linear actuator including an actuator housing including a magnet housing having first and second planar sides. A front plate and a rear plate of the magnet housing are respectively arranged at a front end and a rear end of the housing. A base plate covers a channel defined by the magnet housing, the channel extending between the front end and the rear end of the housing. The linear actuator further includes a controller disposed within an interior space defined by the actuator housing. A first plurality of magnets are secured to the first planar side and a second plurality of magnets are secured to the second planar side. A linear guide is slidably secured to an inner surface of the base plate. A piston assembly has a piston element attached to the linear guide and is disposed to move linearly during operation of the linear actuator. The piston assembly is positioned at least partially within the actuator housing and includes a shaft extending from the piston element and a multi-layer printed circuit board attached to the piston element. The multi-layer printed circuit board defines a printed coil assembly including a plurality of printed coils. The printed coils are positioned between the first plurality of magnets and the second plurality of magnets during operation of the linear actuator. A flex cable is electrically connected to the multi-layer printed circuit board and to the controller.

The disclosure also relates to a linear actuator including an actuator housing having at least a magnet housing and a base plate. The actuator housing defines an interior space within which is disposed a controller. A first plurality of magnets are secured to a first surface of the magnet housing and a second plurality of magnets are secured to a second surface of the magnet housing substantially parallel to the first surface. A linear guide is slidably secured to an inner surface of the base plate. A piston assembly has a piston element attached to the linear guide and is disposed to move linearly during operation of the linear actuator. The piston assembly includes a shaft extending from the piston element and a multi-layer printed circuit board attached to the piston element. The multi-layer printed circuit board defines a printed coil assembly including a plurality of printed coils. The printed coils are positioned between the first plurality of magnets and the second plurality of magnets during operation of the linear actuator. A flex cable is electrically connected to the printed coil assembly and to the controller.

The disclosure is further directed to a piston assembly for a linear actuator. The assembly includes a piston member and a shaft extending from the piston member. A multi-layer printed circuit board is attached to the piston member and defines a printed coil assembly, a controller, and an encoder read head. The printed coil assembly includes a plurality of printed coils where each of the printed coils includes multiple coil traces. Each of the multiple coil traces is printed on a respective one of multiple layers of the printed circuit board.

In another aspect the disclosure concerns a method of manufacturing a linear actuator. The method includes laser cutting and bending metal material to form a piston, a base plate, one or more end plates, and a magnet housing defining an elongated channel. The method further includes securing magnets to inner surfaces of planar sides of the magnet housing and attaching a linear guide structure to an inner surface of the base plate. A piston assembly is provided by securing a shaft and a multi-layer circuit board to the piston. A controller and a plurality of multi-layer printed coils are defined on the multi-layer circuit board. The method includes attaching the piston assembly to the linear guide structure. The base plate is attached to the magnet housing so the piston element and the multi-layer printed circuit board are disposed within the elongated channel. The one or more end plates are also attached to the magnet housing.

The disclosure also elucidates a method of manufacturing a linear actuator which includes providing a magnet housing defining an elongated channel. The magnet housing includes a plurality of magnets secured to inner surfaces of opposing planar sides of the magnet housing. The method further includes attaching a piston assembly to an inner surface of a base plate. The piston assembly includes a shaft and a multi-layer printed circuit board defining a plurality of multi-layer printed coils and a controller. The method also includes attaching the base plate to the magnet housing so that the piston assembly is moveable along the elongated channel.

The disclosure also describes a method of manufacturing a linear actuator which includes the operations of laser cutting and bending metal material to form a piston, a base plate, one or more end plates, and a magnet housing defining an elongated channel. The method further includes securing magnets to inner surfaces of planar sides of the magnet housing and attaching a linear guide structure to an inner surface of the base plate. A shaft and a multi-layer printed circuit board are secured to the piston where a plurality of multi-layer printed coils are defined on the multi-layer circuit board. The method further includes attaching the piston to the linear guide structure and connecting a flex cable between the multi-layer printed circuit board and a controller, where the controller is disposed within the elongated channel. The base plate is attached to the magnet housing so the piston element and the multi-layer printed circuit board are disposed within the elongated channel. The method also includes attaching the one or more end plates to the magnet housing.

The disclosure also relates to a method of manufacturing a linear actuator having a magnet housing defining an elongated channel. The magnet housing includes a plurality of magnets secured to inner surfaces of opposing planar sides of the magnet housing. The method includes attaching a piston assembly to an inner surface of a base plate, the piston assembly including a shaft and a multi-layer printed circuit board defining a plurality of multi-layer printed coils. The method further includes connecting a flex cable between the multi-layer printed circuit board and a controller disposed within the elongated channel. The base plate is attached to the magnet housing so that the piston assembly is moveable along the elongated channel.

It is to be understood that both the foregoing general description and the following detailed description are exemplary and are merely intended to provide further explanation of the subject matter.

BRIEF DESCRIPTION OF THE DRAWINGS

Various objects and advantages and a more complete understanding of embodiments of the present invention are apparent and more readily appreciated by reference to the following Detailed Description and to the appended claims when taken in conjunction with the accompanying Drawings wherein:

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
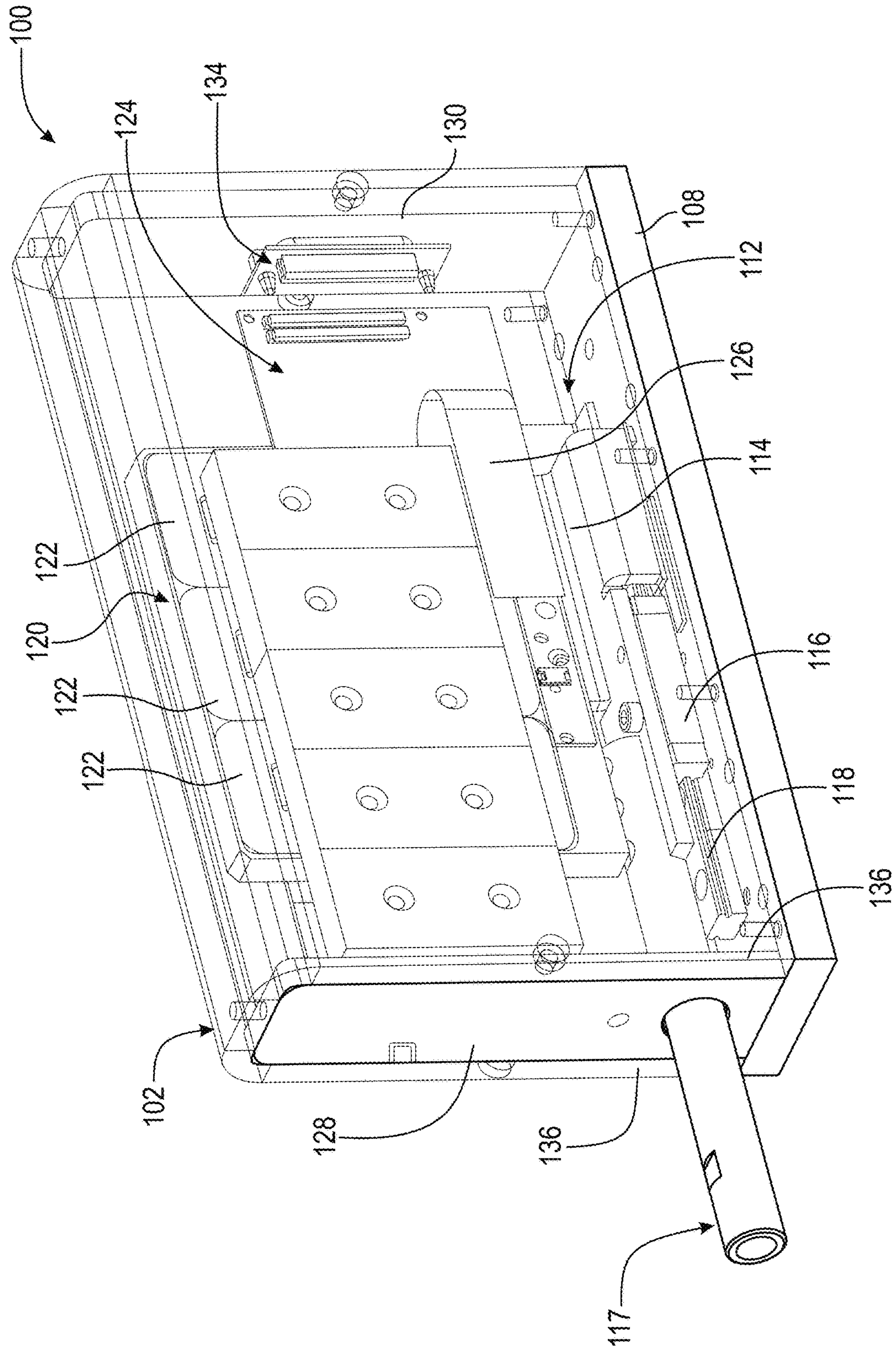
FIG. 1 is a partially transparent perspective view of a moving printed coil actuator in accordance with an embodiment.

FIG. 1 is a partially transparent perspective view of a moving printed coil actuator 100 in accordance with an embodiment. Linear actuator 100 includes a U-shaped laser-cut magnet housing 102 (shown as transparent in FIG. 1) and a base plate 108. A piston assembly 112 is attached to the base plate 108 and includes a piston element 114 attached to a linear guide 116. A shaft 117 is supported by and extends from piston element 114. The linear guide 116 is slidably mounted on a rail 118 attached to the base plate 108, which enables the piston assembly 112 and its shaft 117 to move back and forth along a longitudinal axis of the actuator parallel to the rail 118.

A first multi-layer printed circuit board 120 (shown in partial cutaway view) defining an arrangement of multi-layer printed coils 122 is mounted on the piston element 114. A second printed circuit board 124 defining a controller may be mounted on the base plate 108. In other embodiments the arrangement of multi-layer printed coils 122 and the controller may be defined in layers of a single multi-layer printed circuit board attached to the piston element. In still other embodiments, typically involving actuators of relatively larger sizes, the multi-layer printed circuit board 120 may be replaced by a pair of multi-layer printed circuit boards defining an arrangement of printed coils. In the embodiment of FIG. 1 the first multi-layer printed circuit board 120 and the second multi-layer printed circuit board 124 are connected to opposite ends of a flex cable 126. In this way the controller defined by the second multi-layer printed circuit board 124 may be electrically connected to the arrangement of multi-layer printed coils 122 defined by the first multi-layer printed circuit board 120.

A front plate 128 and a rear plate 130 are respectively attached to front and rear ends the U-shaped laser housing 128. It may be appreciated that the U-shaped laser housing 128, the base plate 108, the front plate 128 and the rear plate 130 collectively define an interior space in which is disposed the piston assembly 112. An external connector 134 mounted within the rear plate 130 may be connected to the second circuit board 124 by, for example, a flex cable (not shown) so as to enable the controller to access power and communicate with external computing systems.

As is discussed below, in one embodiment the magnet-housing 102 and the base plate 108 are created by cutting a large steel plate using a laser cutting apparatus. The laser cutting apparatus, which may be implemented using a system such as, for example, a Cincinnati CL-900 fiber laser cutting system, may also define holes or slots in the base plate 108 and magnet housing 102. This facilitates mounting of the piston assembly 112 to the base plate 108 and the subsequent attachment of the base plate 108 to the magnet housing 102.

In order to create a set of magnet housings 102 at scale, the laser cutting apparatus is used to cut a set of rectangular portions from the steel plate. These are each bent so as to form a set of U-shaped channels corresponding to the set of magnet housings 102. In one embodiment this process enables the channels of the magnet housings 102 to be held to a width variance of approximately 30 microns. In addition, both the channel width and height of the housings may be varied. For example, in one embodiment the channel width of the housing may be desired to be of a particular value, e.g., 15 mm, in view of the dimensions of the linear guide 116 that is desired to be utilized.

In a particular embodiment the linear actuator 100 is dimensioned to have a channel width of 25 mm and to include first and second opposing planar side walls 136, 138 having heights of 62.5 mm. Manufacturing the constituent elements of the housing for the actuator 100, i.e., the magnet housing 102, base plate 108 and front and rear plates 128, 130 may be done quite rapidly using the laser cutting and bending approach described herein. For example, cutting the magnet housing 102 from a flat steel plate requires approximately 10 seconds and bending the laser-cut piece requires approximately another 10 seconds. After the rail 118 and the piston assembly 112 is secured to the base plate 108, the base plate 108 may be welded to the magnet housing 102 in approximately 10 seconds. Welding of the front plate 128 and rear plate 130 to the front and rear ends, respectively, of the magnet housing 102 requires a similar amount of time. Overall this manufacturing process consumes substantially less time and expense than would be required to manufacture a similar housing structure using Computer Numerical Control (CNC) milling techniques; that is, lathes operated by existing CNC systems.

Figure 2:
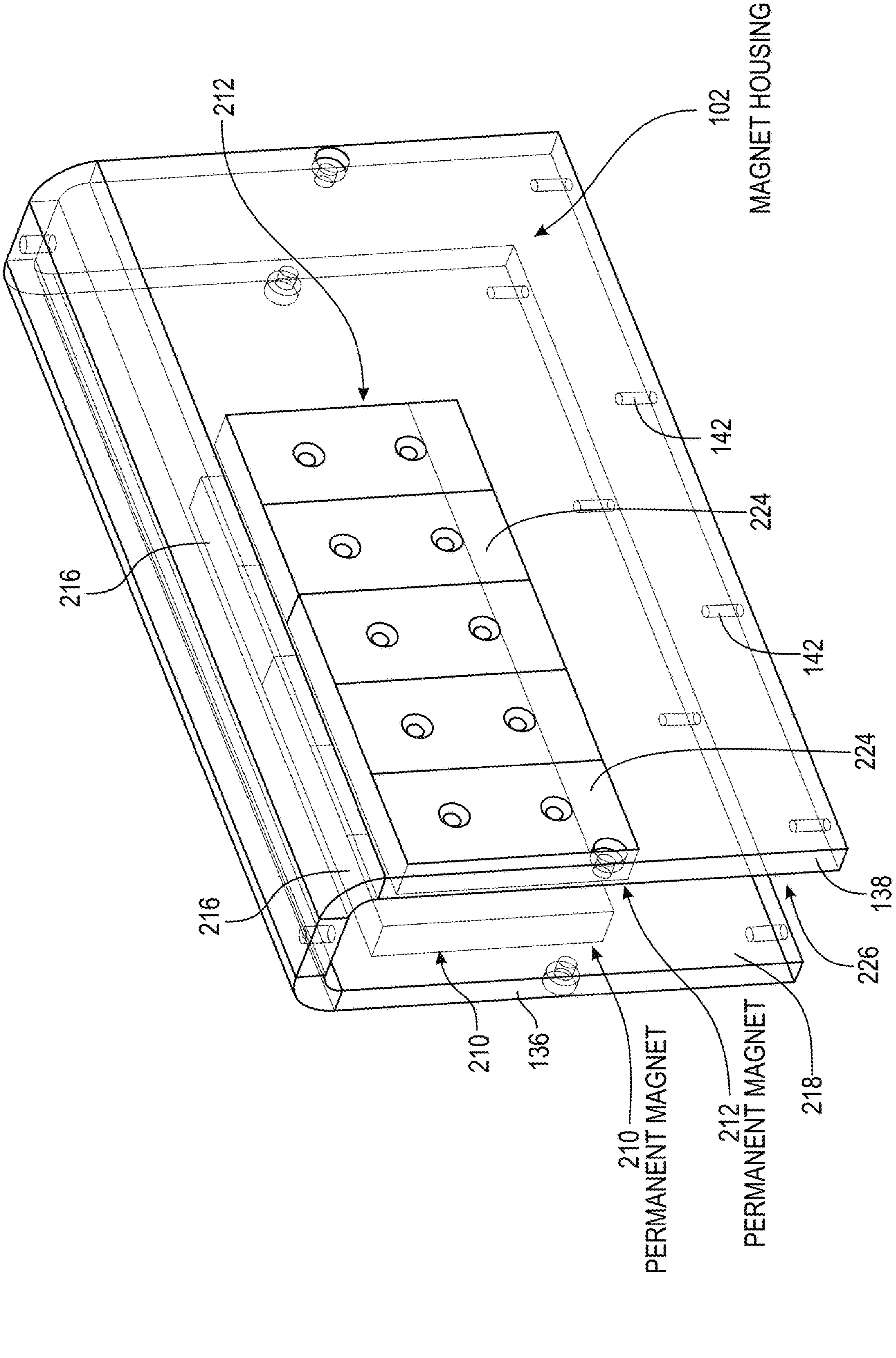
FIG. 2 is a partially transparent view of a magnet housing assembly of the actuator of FIG. 1.

Attention is now directed to FIG. 2, which is a partially transparent view of a magnet housing assembly of the actuator 100. As shown, the magnet housing assembly includes the magnet housing 102 and first and second planar arrays 210, 212 of permanent magnets. In the embodiment of FIG. 2 the first planar array 210 includes a set of 5 magnets 216 arranged substantially contiguously on an inner planar surface 218 of the first planar side wall 136. The second planar array 212 includes a set of 5 magnets 224 arranged substantially contiguously on an inner planar surface 226 of the second planar side wall 138. The magnets 216, 224 may be respectively secured to the planar side walls 136, 138 by, for example, screws embedded within holes cut in the side walls 136, 138 during the laser cutting process. Alternatively, the magnets 216, 224 may be secured to the side walls 136, 138 using an adhesive substance or the like. In one embodiment cylindrical holes 142 or other depressions are created on edges of the magnet housing abutting the base plate 108. These holes 142 may be utilized to facilitate attachment of the magnet housing 102 to the base plate 108 during a welding process or other process for joining the magnet housing 102 and the base plate 108.

Figure 3A:
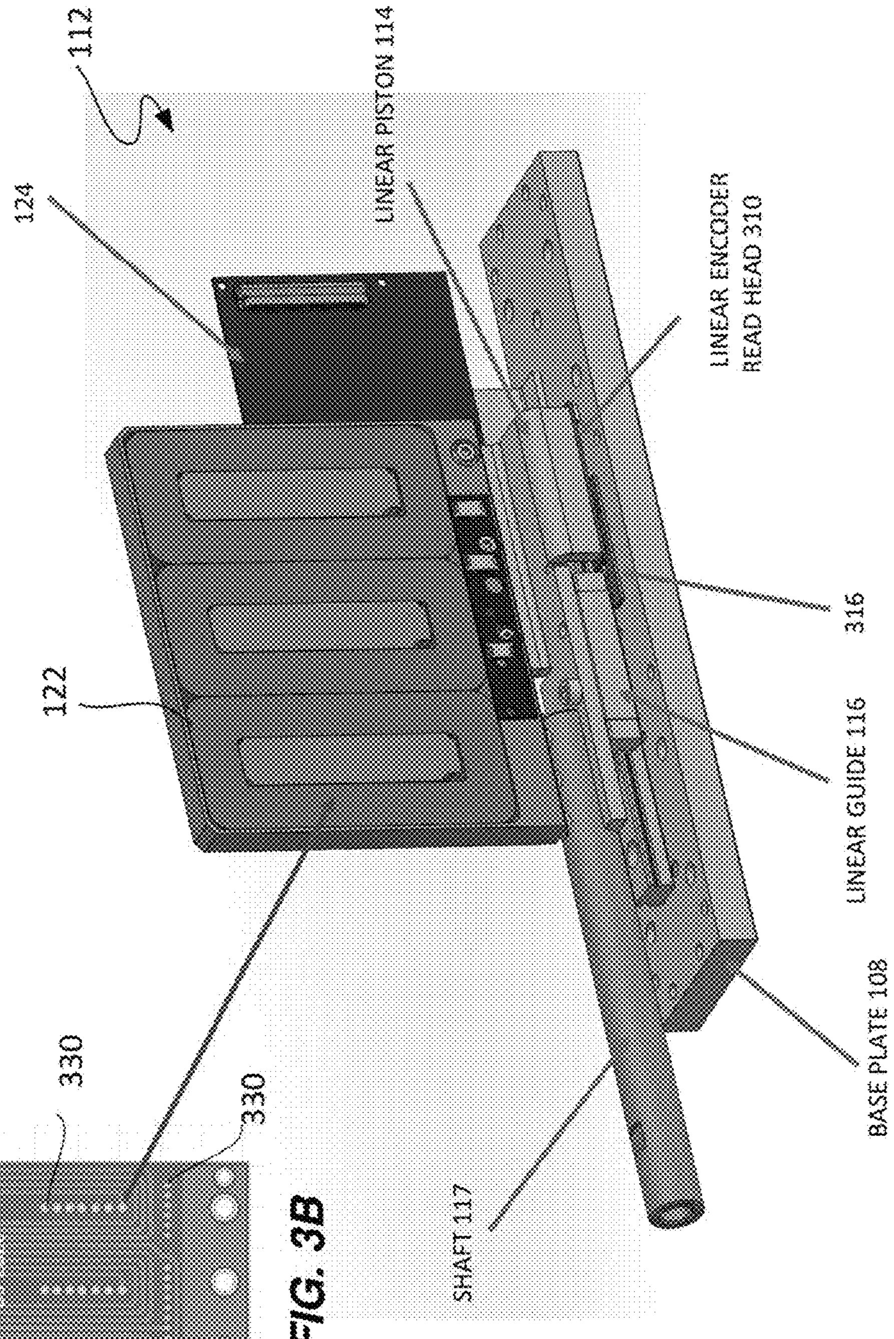
FIG. 3A is a perspective view is provided of the piston assembly within the actuator of FIG. 1 as attached to the base plate.

Turning now to FIG. 3A, a perspective view is provided of the piston assembly 112 as attached to the base plate 108. As shown, a linear encoder read head 310 is also attached to the linear piston element 114. A linear encoder scale 316 is located so as to be readable by the linear encoder read head 310 as the piston 114 and linear guide 116 move along the rail 118.

Figure 3B:
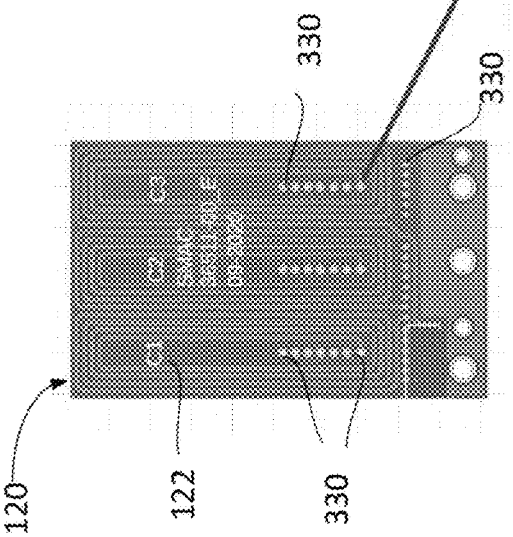
FIG. 3B illustrates a particular implementation of a multi-layer printed circuit board configured to define a set of three multi-layer printed coils.

FIG. 3B illustrates a particular implementation of the first multi-layer printed circuit board 120 configured to define a set of three multi-layer printed coils 122 (C1, C2, C3). As is discussed below, each printed coil layer of the multi-layer printed coils may be defined on a different layer of the multi-layer printed circuit board 120, which will generally be implemented as a multi-layer printed circuit board.

In general, a multi-layer printed circuit board may be manufactured by stacking an insulating adhesive, known as a prepreg, between a pair of copper clads. A drilling operation forms holes on the copper clad laminate which may be plated on the inside to form connections between layers. A patterning process is then used to form a circuit pattern on each layer. Creating each layer of a multi-layer circuit board may involve lamination of prepregs and copper foils, laser drilling, metallization of through holes, and formation of traces using lithographic techniques. Multi-layer circuit boards of many layers (e.g., 8 or more) may be generated using this type of process.

In the present system each layer of the multi-layer printed circuit board 120 may define a coil trace for one layer of each of the multi-layer printed coils 122. FIG. 3B illustrates exemplary coil traces for each of the multi-layer printed coils 122, i.e., coils C1, C2, C3. In one embodiment substantially similar or identical coil trace patterns are defined for each of C1, C2, C3 on each of multiple (e.g., 9) layers of the multi-layer printed circuit board 120 such that the traces in all layers are aligned and generate reinforcing electromagnetic field patterns. Interconnections between coils C1, C2 and C3 may be defined on an interconnection layer of the circuit board 120 in conjunction with metallized through holes 330 to facilitate inter-layer connections.

Figure 4:
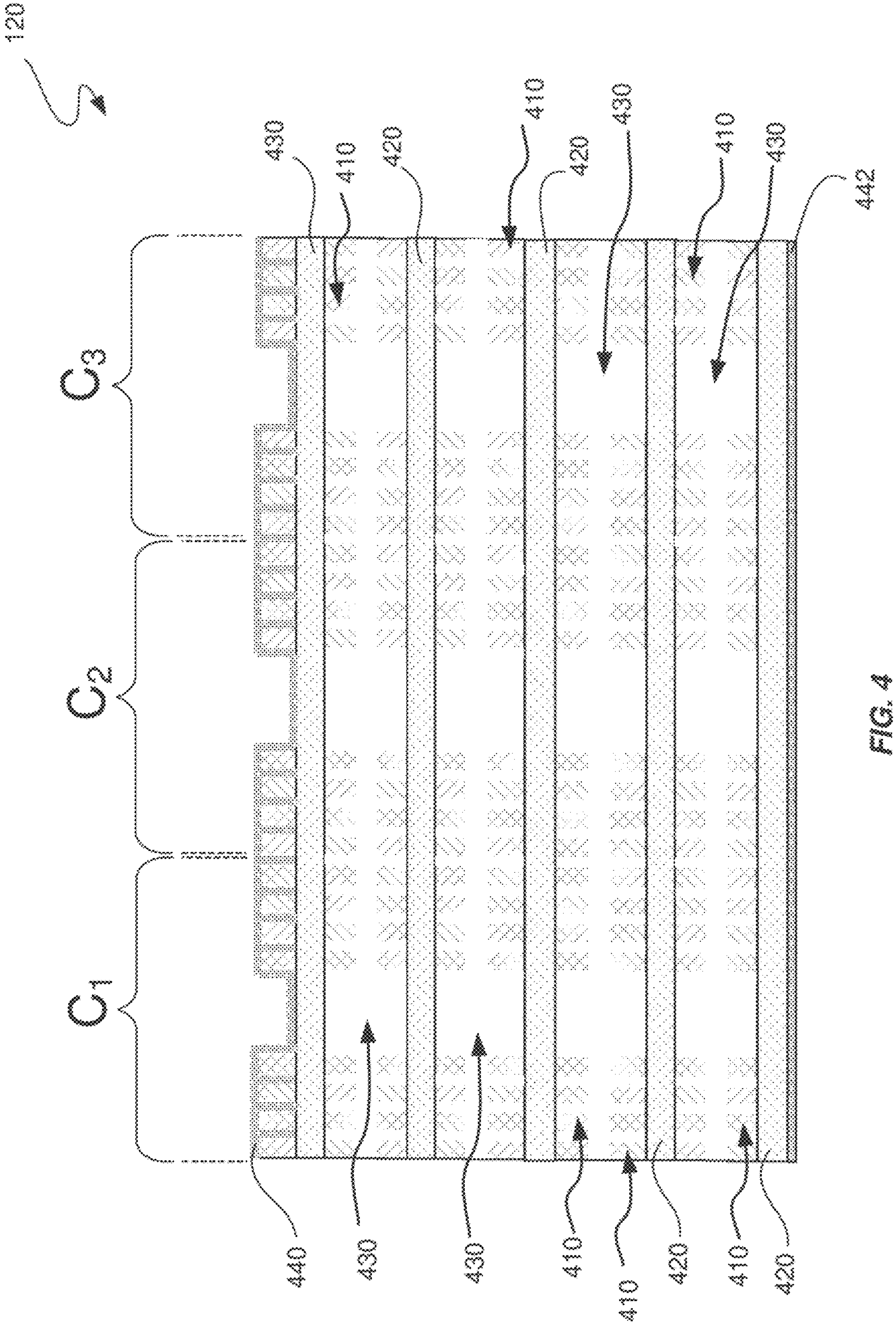
FIG. 4 provides a simplified sectional view of a multi-layer printed circuit board as configured to define three multi-layer printed coils.

FIG. 4 provides a simplified sectional view of the multi-layer printed circuit board 120 as configured to define the three multi-layer printed coils C1, C2 and C3. FIG. 4 is intended to illustrate general characteristics of the structure of the coils C1, C2 and C3 and omits details relating to their interconnection on one or more layers of the circuit board 120 as well as physical interconnections between layers effected by, for example, plated vias or the like. As shown, conductive traces 410 define each layer of each of the multi-layer printed coils C1, C2, C3. The conductive traces 410 may be composed of a copper foil and are applied to each side of a plurality of core boards 420. As is known, the double-sided copper clad core boards 420 provide structural support. Prepreg adhesive layers 430 are interposed between the core boards and function to provide insulation. The multi-layer printed circuit board may be sealed at the top and bottom by a top layer 440 and a bottom layer 442, respectively.

Implementations of the disclosed moving coil linear actuator will typically include one or two multi-layer printed circuit boards defining the printed coil assembly. For moving coil actuators having relatively small dimensions (e.g., on the order of 15 mm wide), a single multi-layer printed circuit board will typically be sufficient to realize the printed coil assembly. Larger moving coil actuators configured in accordance with the disclosure may require two multi-layer printed circuit boards to implement the printed coil assembly. When two multi-layer circuit boards are utilized the boards may be stacked so as to yield a multi-layer structure similar to that depicted in FIG. 4.

In one implementation the printed coils are defined using relatively thick copper traces in order to match ordinary motor wire gauges (e.g., in the 30 gauge range). For actuators of relatively small dimensions the requisite current carrying capacity may be met with somewhat smaller copper traces (e.g., commensurate with 33 gauge wire). For larger actuators it is anticipated that somewhat larger copper traces (i.e., having cross-sectional areas greater than 30 gauge wire) will be utilized.

The present approach of utilizing one more multi-layer printed circuit boards to implement the multiple layers of each printed coil leads to a number of advantages. For example, the need for costly winding machines is eliminated and the positioning of the copper "wire" can be much more precise than in mechanical winders. As a consequence, resistance variation is reduced by up to 90% relative to mechanical winders. The wiring of the printed coils together is not a separate operation but rather part of the design of the multi-layer printed circuit board upon which the coils are realized. The encoder reader head, which is used as the position feedback sensor in the servo, can be assembled on the printed coil. Moreover, the wiring circuit is part of the printed coil design, which obviates the need for brackets, cables, and soldering.

Figure 5:
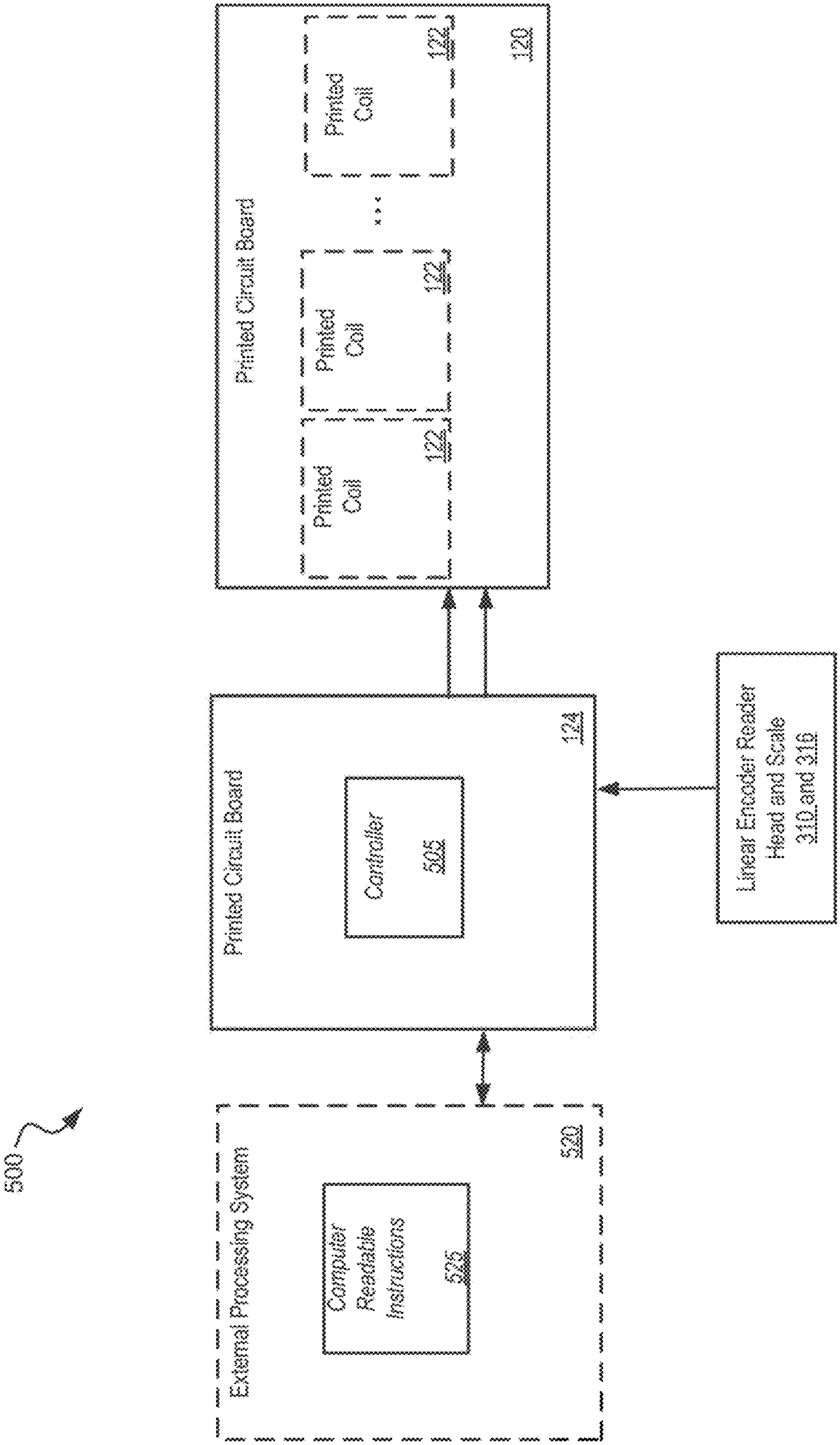
FIG. 5 is a block diagram of principal components of a linear actuator in accordance with the disclosure.

Referring now to FIG. 5, a block diagram is provided of principal components 500 of the linear actuator 100. The principal components 500 include a controller 505 defined by the second multi-layer printed circuit board 124, the arrangement of printed coils 122 defined by the first multi-layer printed circuit board 120 and linear encoder components including the linear encoder reader head 310 and the linear encoder scale 316. Again, the first multi-layer printed circuit board 124 may be realized using a single multi-layer printed circuit board or a stacked arrangement of multi-layer printed circuit boards. An optional external processing system 520 may execute computer readable instructions 525 complementing the control functionality effected by the controller 505.

During operation of the linear actuator 100, the controller 505, and in some cases the external central system 520, operate to control an electric current provided to the arrangement of printed coils 122. An electromotive force is supplied to the piston 117 by the interaction between the magnets 216 and 224 and an electromagnetic field generated in response to the provision of this electric current to the arrangement of printed coils 122. This electromotive force can provide linear reciprocal movement to the entire piston assembly 112 including the piston 114, the first multi-layer printed circuit board defining the arrangement of printed coils 122, the shaft 117, the flexible cable 126 and the linear guide 116 (as well as the second multi-layer printed circuit board 124 when it is mounted to the piston element 114). The linear encoder read head 310 interacts with the linear encoder scale 316, which is attached to the piston base plate 108, to provide a feedback signal to the controller defined by the second multi-layer printed circuit board 124. The feedback signal tracks the linear motion of the piston 114 and, hence, the shaft 117. Thus the controller 505 is able to selectively position the piston 114 along the entire path provided by the linear guide 116.

Figure 6:
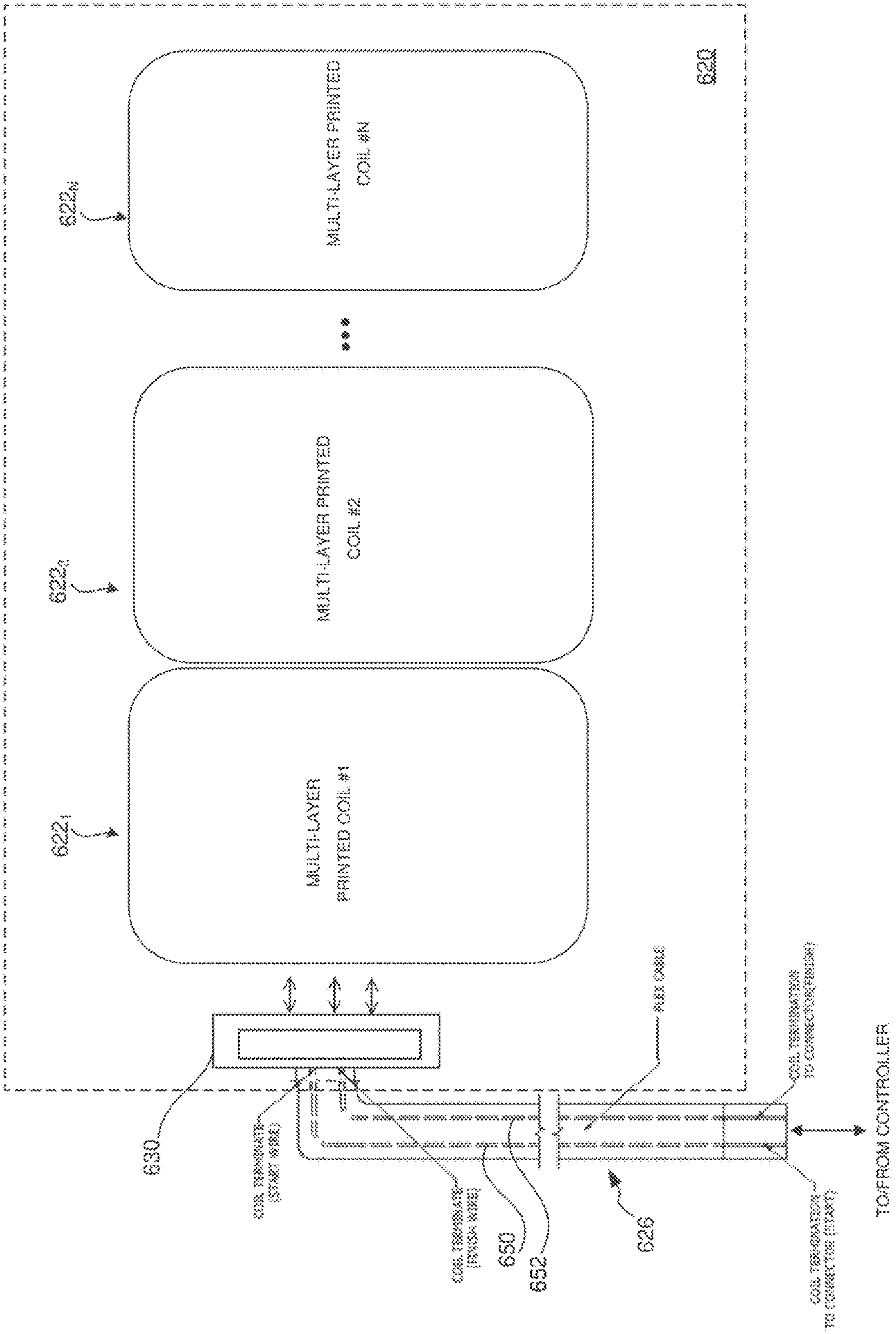
FIG. 6 depicts a block diagrammatic view of a printed coil arrangement including a set of N multi-layer printed coils defined within a multi-layer printed circuit board.

FIG. 6 depicts a block diagrammatic view of a printed coil arrangement including a set of N multi-layer printed coils 622 defined within a multi-layer printed circuit board 620. The N multi-layer printed coils 622 may each include a relatively large number of layers (e.g., 8 to 14 layers), and may be included within embodiments of the linear actuator described herein. Each multi-layer printed coil 622 may be structured substantially similarly or identically to the multi-layer printed coils C1, C2, C3 depicted in FIG. 4. As shown, the printed coil arrangement includes a flex cable 626 that extends between a connector 630 on the multi-layer printed circuit board 620 and a connector (not shown) on either the circuit board 620 or other circuit board defining a controller. In one embodiment a first printed coil layer within a first multi-layer printed coil $622_1$ includes a pair of wire leads, i.e., a start lead and a finish lead, for conducting current to and from the N multi-layer printed coils $622_1$, $622_2$, $622_N$. The start lead is also connected to a first connection line 650 of the flex cable 626 and the finish lead is connected to a second connection line 652 of the flex cable 626.

Figure 7:
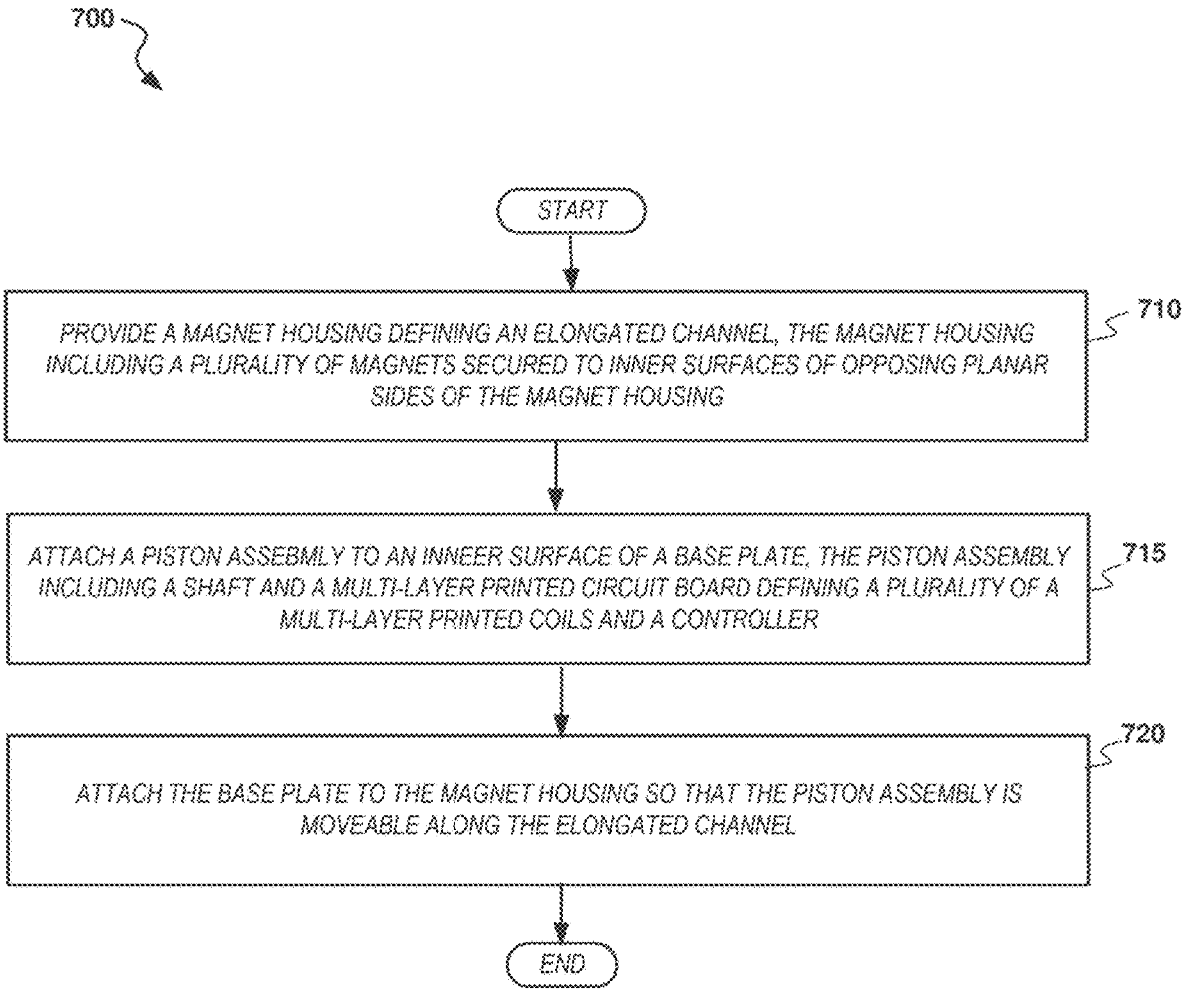
FIG. 7 is a flowchart of a process for manufacturing a linear actuator having a piston configured with a multi-layer printed circuit board defining multi-layer printed coils in accordance with an embodiment.

Attention is now directed to FIG. 7, which is a flowchart of a process 700 for manufacturing a linear actuator having a piston configured with a multi-layer printed circuit board defining multi-layer printed coils, in accordance with an embodiment. The process 700 includes providing a magnet housing defining an elongated channel where the magnet housing includes a plurality of magnets secured to inner surfaces of opposing planar sides of the magnet housing (stage 710). A piston assembly is attached to an inner surface of a base plate, the piston assembly including a shaft and a multi-layer printed circuit board defining a plurality of a multi-layer printed coils and a controller (stage 715). The base plate is attached to the magnet housing so that the piston assembly is moveable along the elongated channel (stage 720).

Figure 8:
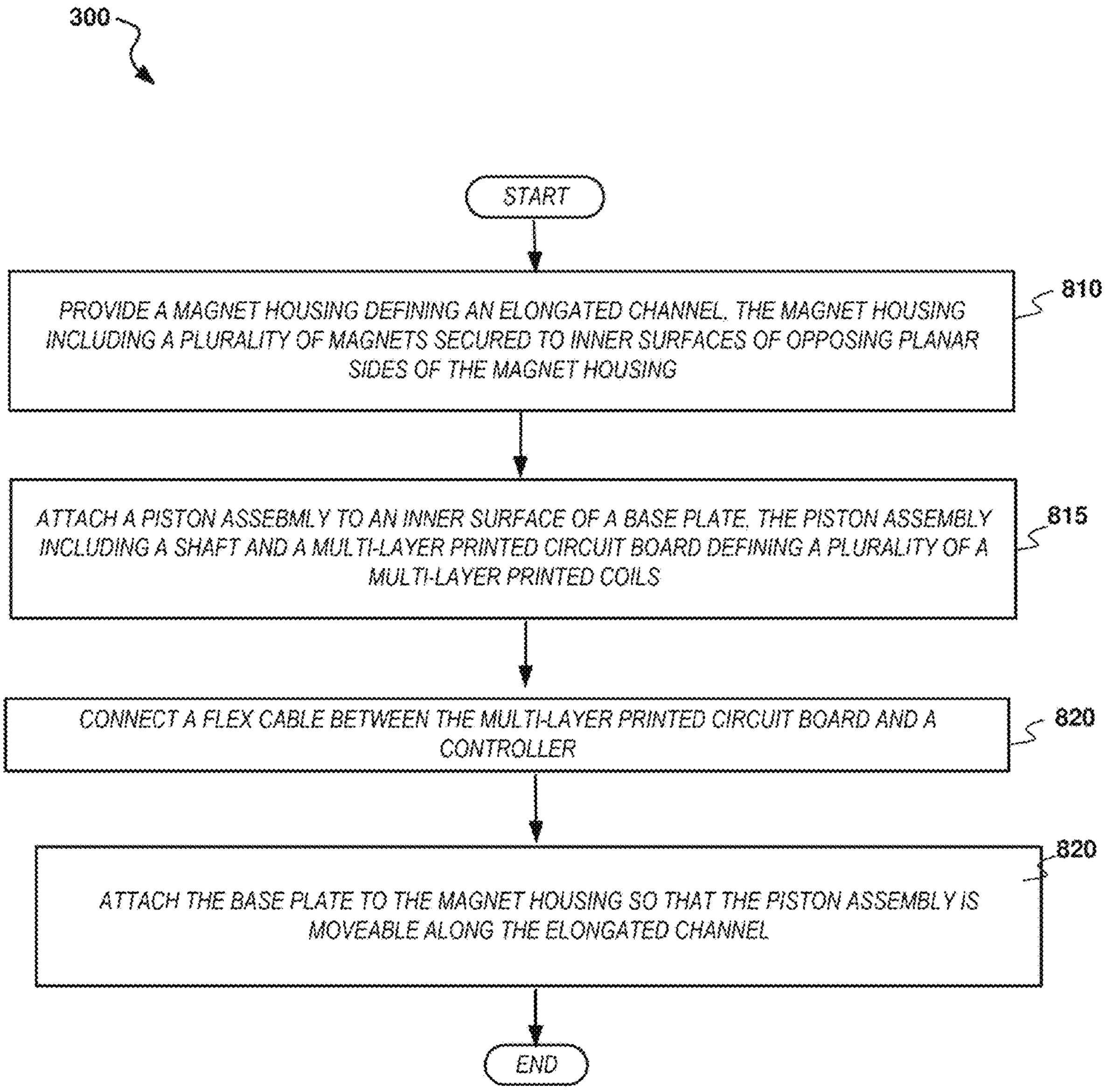
FIG. 8 is a flowchart of a process for manufacturing a linear actuator having a piston configured with a multi-layer printed circuit board defining multi-layer printed coils and having a controller disposed on a separate printed circuit board.

FIG. 8 is a flowchart of a process 800 for manufacturing a linear actuator having a piston configured with a printed circuit board defining multi-layer printed coils and having a controller disposed on a separate printed circuit board. The process 800 includes providing a magnet housing defining an elongated channel where the magnet housing includes a plurality of magnets secured to inner surfaces of opposing planar sides of the magnet housing (stage 810). A piston assembly is attached to an inner surface of a base plate, the piston assembly including a shaft and a multi-layer printed circuit board defining a plurality of a multi-layer printed coils (stage 815). A flex cable is connected between the multi-layer printed circuit board and a controller, which may be disposed on a separate printed circuit board (stage 820). The base plate is attached to the magnet housing so that the piston assembly is moveable along the elongated channel (stage 825).

Figure 9:
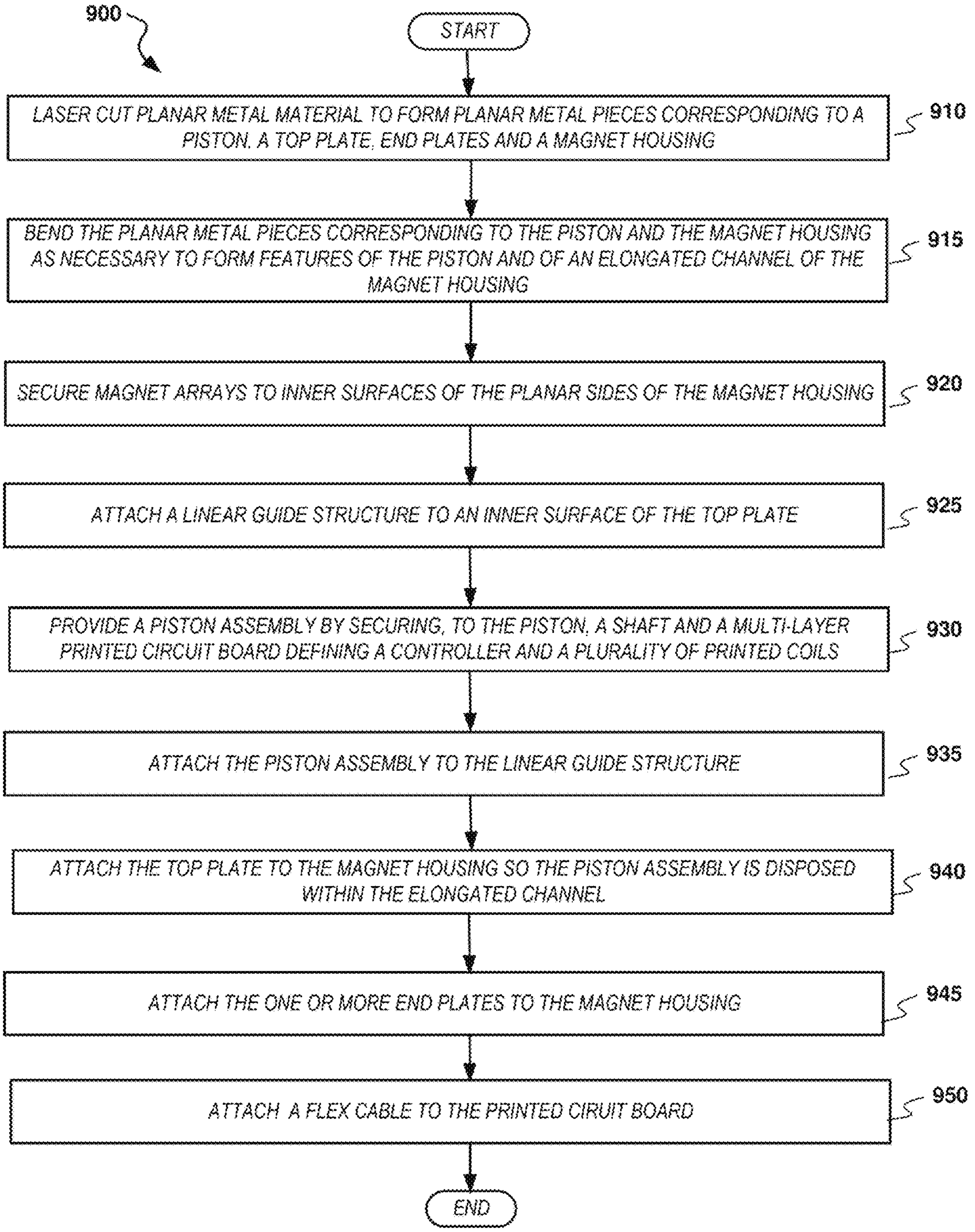
FIG. 9 is a flowchart of a process for manufacturing a linear actuator having a laser-cut housing and a piston configured with a multi-layer printed circuit board defining multi-layer printed coils.
Figure 11:
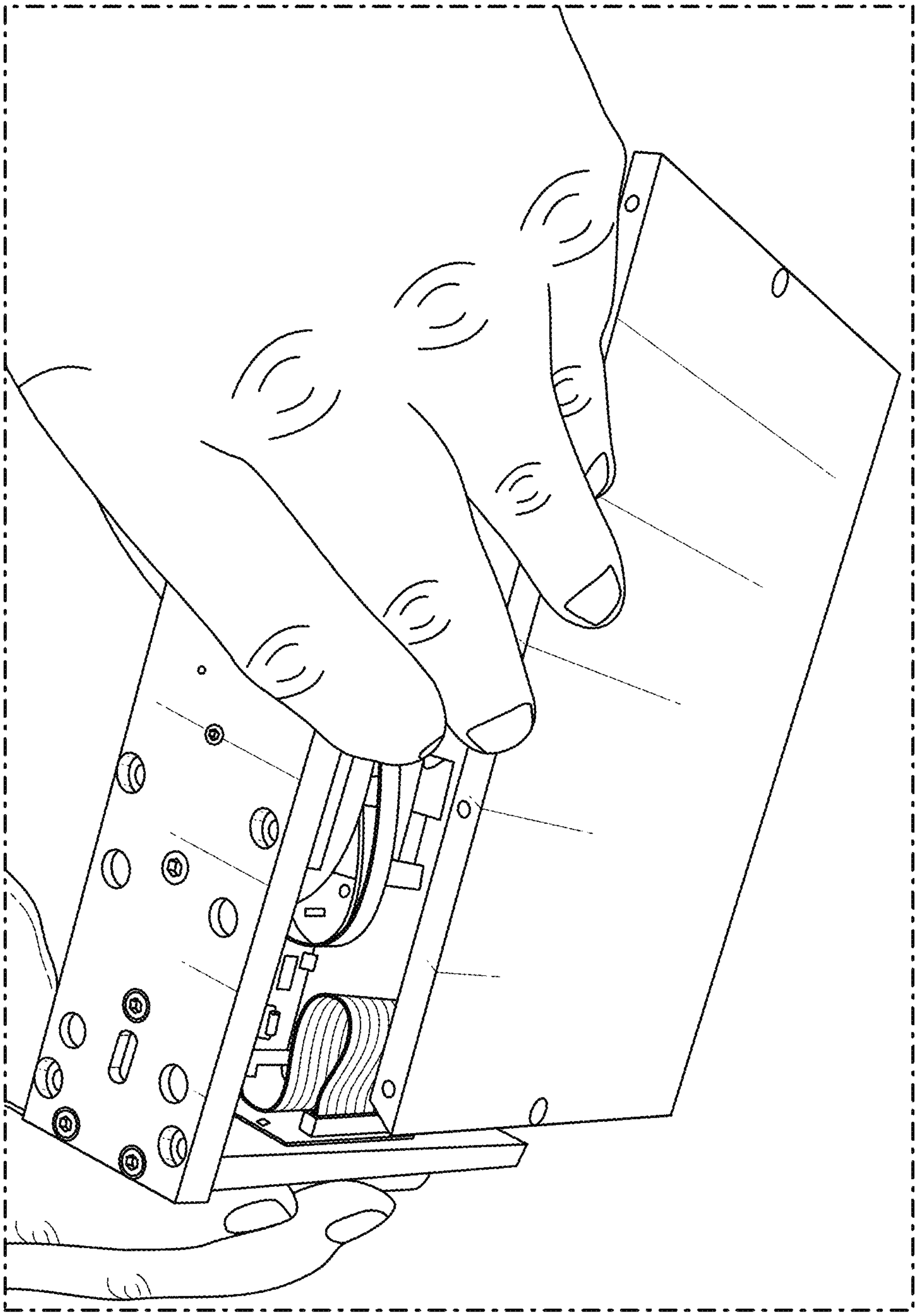
FIG. 11 depicts a piston assembly being lowered into an elongated channel of a magnet housing.

Reference is now made to FIG. 9, which is a flowchart of a process 900 for manufacturing a linear actuator having a laser-cut housing and a piston configured with a multi-layer printed circuit board defining multi-layer printed coils. The process 900 includes laser cutting planar metal material to form planar metal pieces corresponding to a piston, a top plate, end plates and a magnet housing (stage 910). The planar metal pieces corresponding to the piston and the magnet housing are then bent as necessary to form features of the piston and of an elongated channel of the magnet housing (stage 915). Arrays of magnets may then be secured to inner surfaces of the planar sides of the magnet housing (stage 920). A linear guide structure is attached to an inner surface of the top plate (stage 925). A piston assembly may be created by securing, to the piston, a shaft and a multi-layer printed circuit board defining a controller and a plurality of printed coils (stage 930). The piston assembly is attached to the linear guide structure (stage 935). The piston assembly, to which the top plate is attached, is lowered into the elongated channel of the magnet housing (FIG. 11) and the top plate is attached to the magnet housing (stage 940). The one or more end plates are also attached to the magnet housing in order to create a closed interior space containing the piston assembly (stage 945). In one implementation a flex cable is attached to the multi-layer printed circuit board and to a connector in one of the end plates before the end plates are attached to the magnet housing (stage 950).

Figure 10:
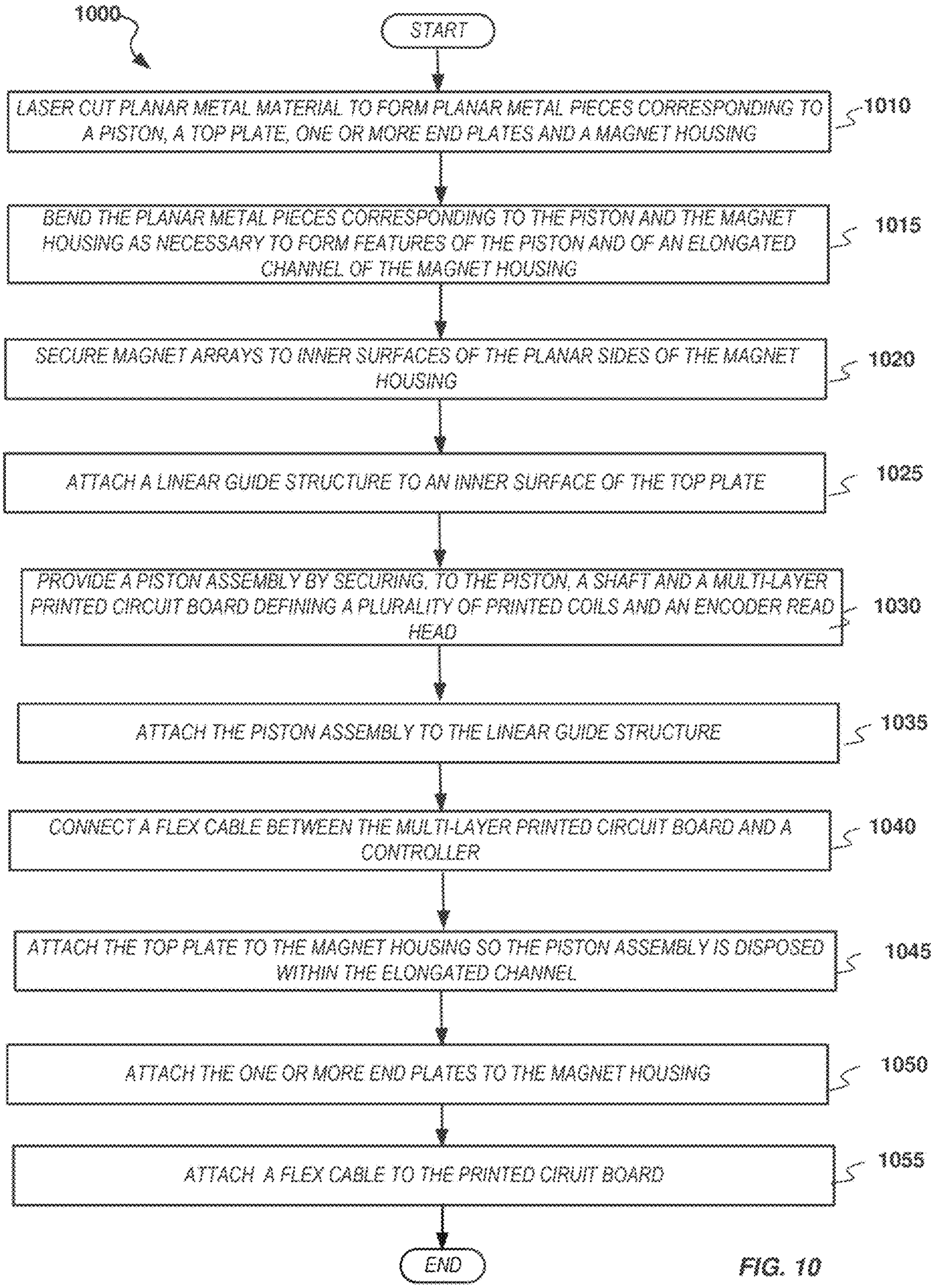
FIG. 10 is a flowchart of a process for manufacturing a linear actuator having a laser-cut housing and a piston configured with a multi-layer printed circuit board defining multi-layer printed coils and a controller.

FIG. 10 is a flowchart of a process 1000 for manufacturing a linear actuator having a laser-cut housing and a piston configured with a multi-layer printed circuit board defining multi-layer printed coils and a controller. The process 1000 includes laser cutting planar metal material to form planar metal pieces corresponding to a piston, a top plate, end plates and a magnet housing (stage 1010). The planar metal pieces corresponding to the piston and the magnet housing are then bent as necessary to form features of the piston and of an elongated channel of the magnet housing (stage 1015). Arrays of magnets may then be secured to inner surfaces of the planar sides of the magnet housing (stage 1020). A linear guide structure is attached to an inner surface of the top plate (stage 1025). A piston assembly may be created by securing, to the piston, a shaft and a multi-layer printed circuit board defining a plurality of printed coils and an encoder read head (stage 1030). The piston assembly is attached to the linear guide structure (stage 1035). A flex cable may be connected between the multi-layer printed circuit board and a controller attached to an inner surface of the top plate, the end plates or the magnet housing (stage 1040). The piston assembly, to which the top plate is attached, is lowered into the elongated channel of the magnet housing (FIG. 11) and the top plate is attached to the magnet housing (stage 1045). The one or more end plates are also attached to the magnet housing in order to create a closed interior space containing the piston assembly (stage 1050). In one implementation an additional flex cable is attached to the multi-layer printed circuit board and to a connector in one of the end plates before the end plates are attached to the magnet housing (stage 1055).

Figure 12:
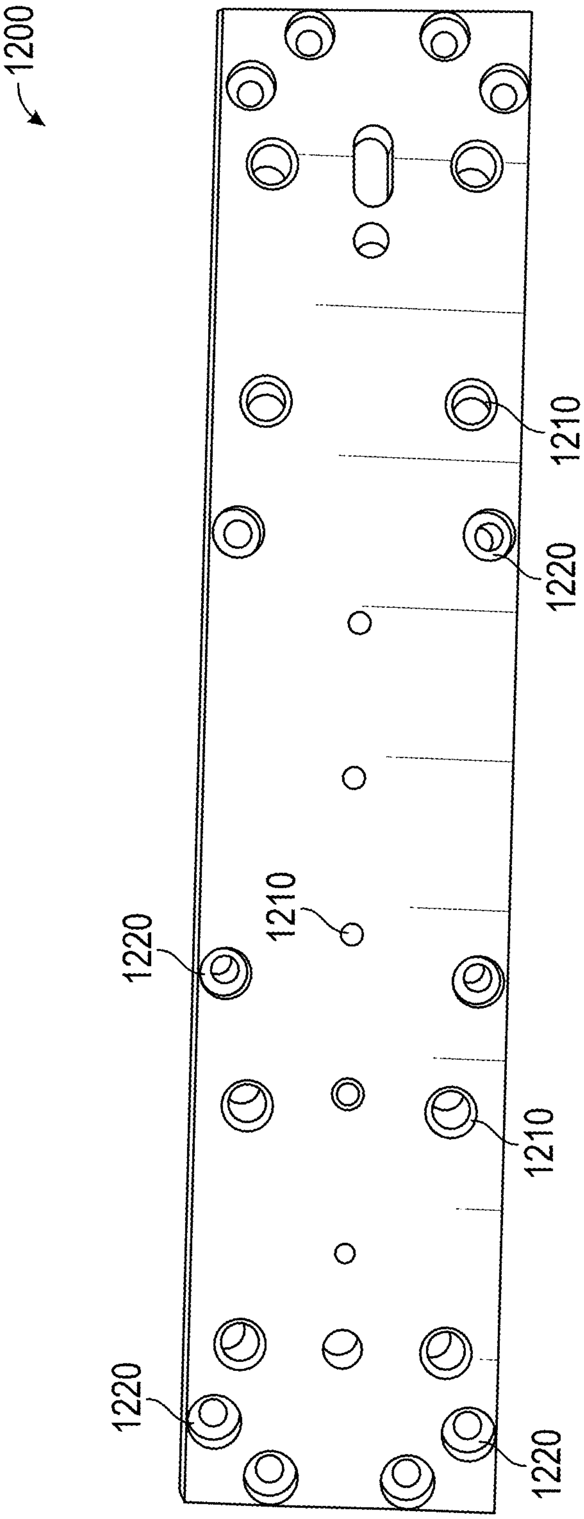
FIGS. 12 and 13 are top views of an exemplary top plate and U-shaped magnet housing created by laser cutting one or more planar pieces of metal.
Figure 13:
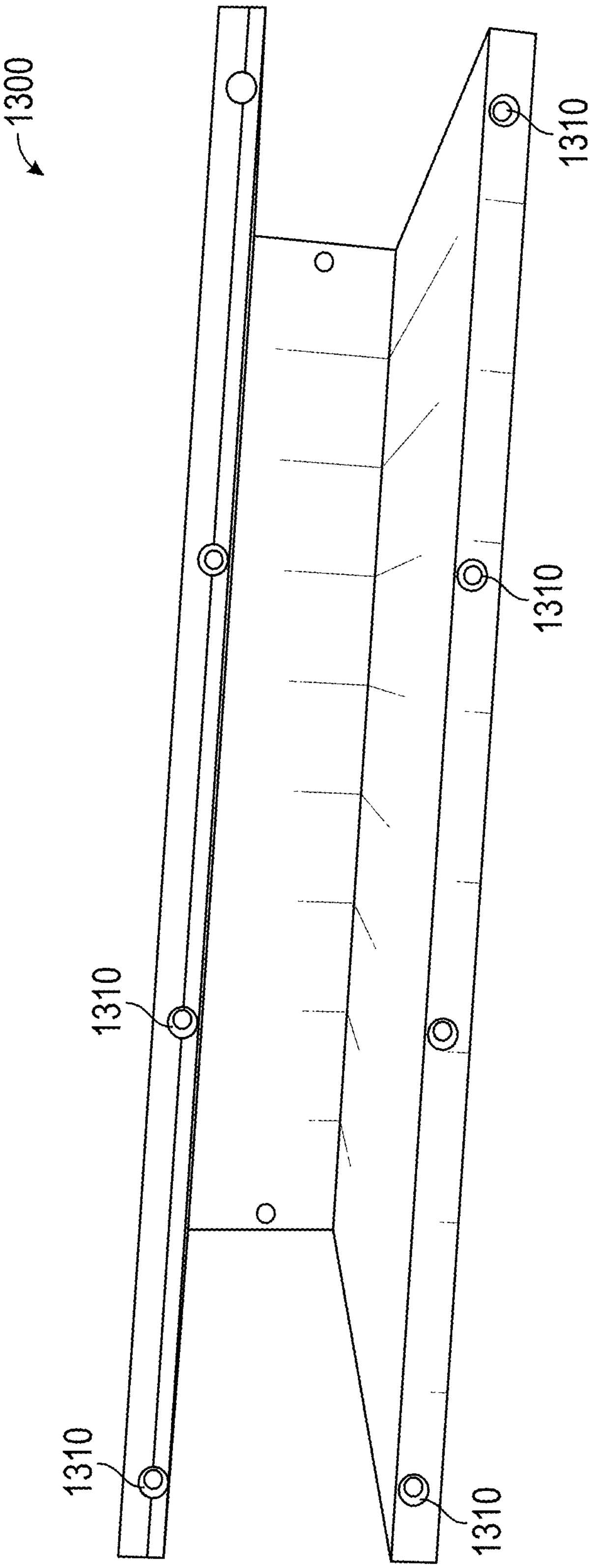

Turning now to FIGS. 12 and 13, top views are provided of an exemplary top plate 1200 and U-shaped magnet housing 1300 created by laser cutting one or more planar pieces of metal. In one embodiment the laser cutting process not only defines a length and width of the top plate 1200 but also defines various mounting holes 1210 and attachment holes 1220. The mounting holes 1210, which may or may not extend all the way through the thickness of the top plate 1200, facilitate mounting of a linear guide and piston assembly to the top plate 1200. This mounting may be achieved by, for example, using screws or via a soldering process. The attachment holes 1220 facilitate attachment of the top plate 1200 to the U-shaped magnet housing 1300. As shown, the magnet housing 1300 includes a plurality of attachment holes 1310 spaced to align with the attachment holes 1220.

Figure 14:
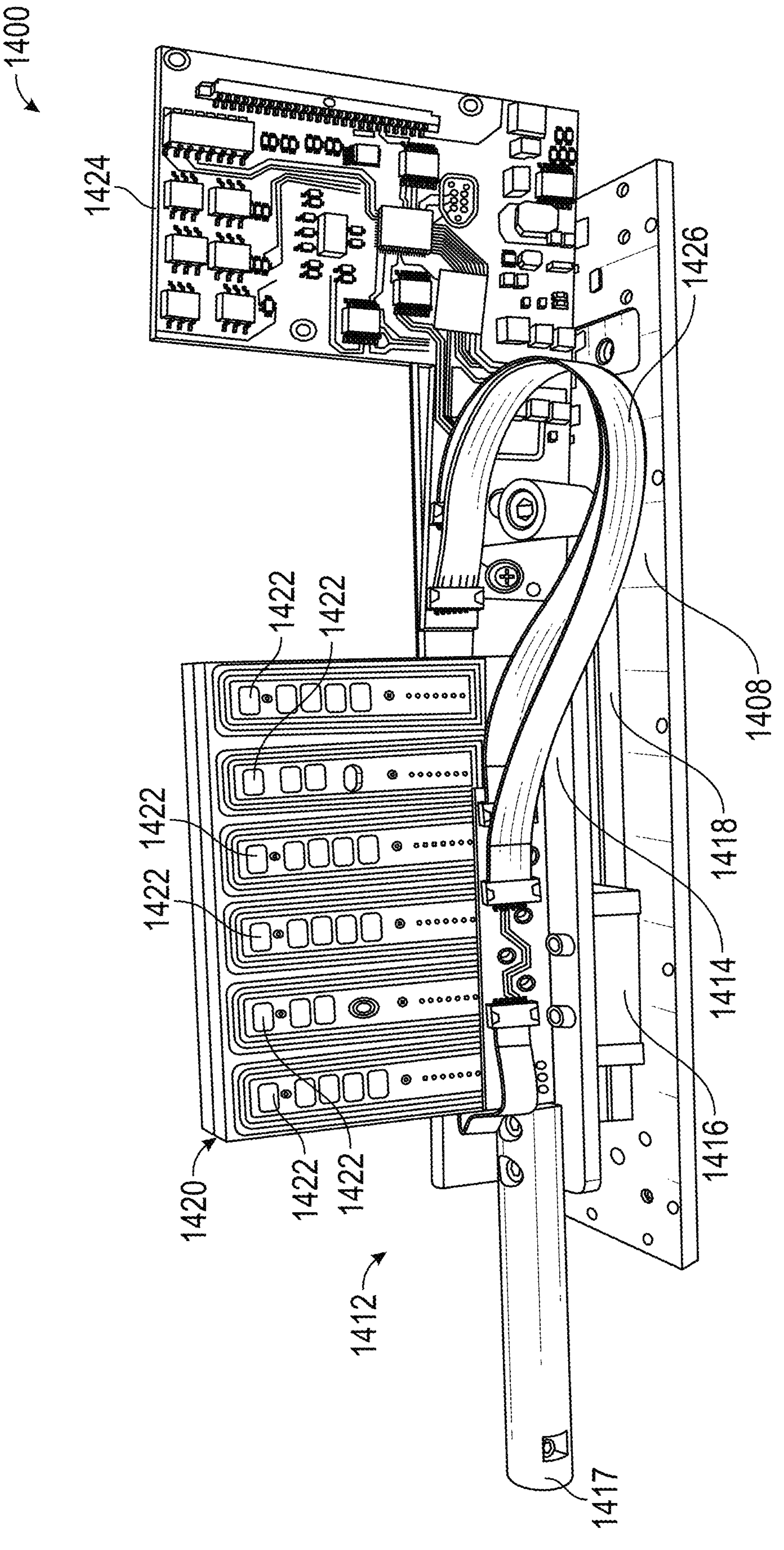
FIGS. 14 and 15 are side perspective views of a piston base assembly for an embodiment of a moving printed coil actuator in accordance with the disclosure.
Figure 15:
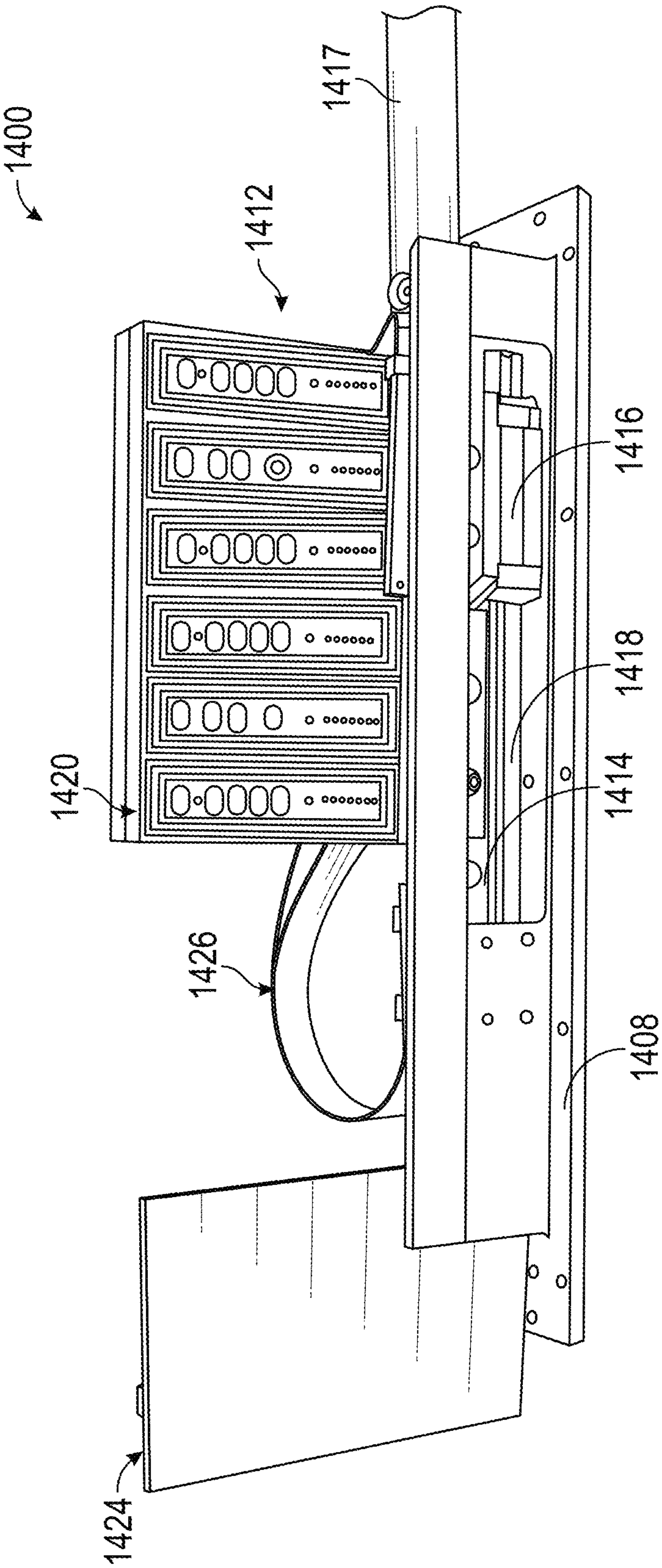

Attention is now directed to FIGS. 14 and 15, which are side perspective views of a piston base assembly 1400 for an embodiment of a moving printed coil actuator in accordance with the disclosure. The piston base assembly 1400 includes a piston assembly 1412 attached to a base plate 1408. The piston assembly 1412 includes a piston element 1414 attached to a linear guide 1416. A shaft 1417 is supported by and extends from piston element 1414. The linear guide 1416 is slidably mounted on a rail 1418 attached to the base plate 1408, which enables the piston assembly 1412 and its shaft 1417 to move back and forth along a longitudinal axis of the actuator parallel to the rail 1418.

A first multi-layer printed circuit board 1420, which is comprised of 14 layers and defines an arrangement of multi-layer printed coils 1422 (C1, C2, C3, C4, C5, C6), is mounted on the piston element 1414. A second multi-layer printed circuit board 1424 defining a controller may be mounted on the base plate 1408. In other embodiments the arrangement of multi-layer printed coils 1422 and the controller may be defined in layers of a single multi-layer printed circuit board attached to the piston element 1414. In the embodiment of FIG. 14 the first multi-layer printed circuit board 1420 and the second multi-layer printed circuit board 1424 are connected to opposite ends of a flex cable 1426. In this way the controller defined by the second multi-layer printed circuit board 1424 may be electrically connected to the arrangement of multi-layer printed coils 1422 defined by the first multi-layer printed circuit board 1420.

Figure 16:
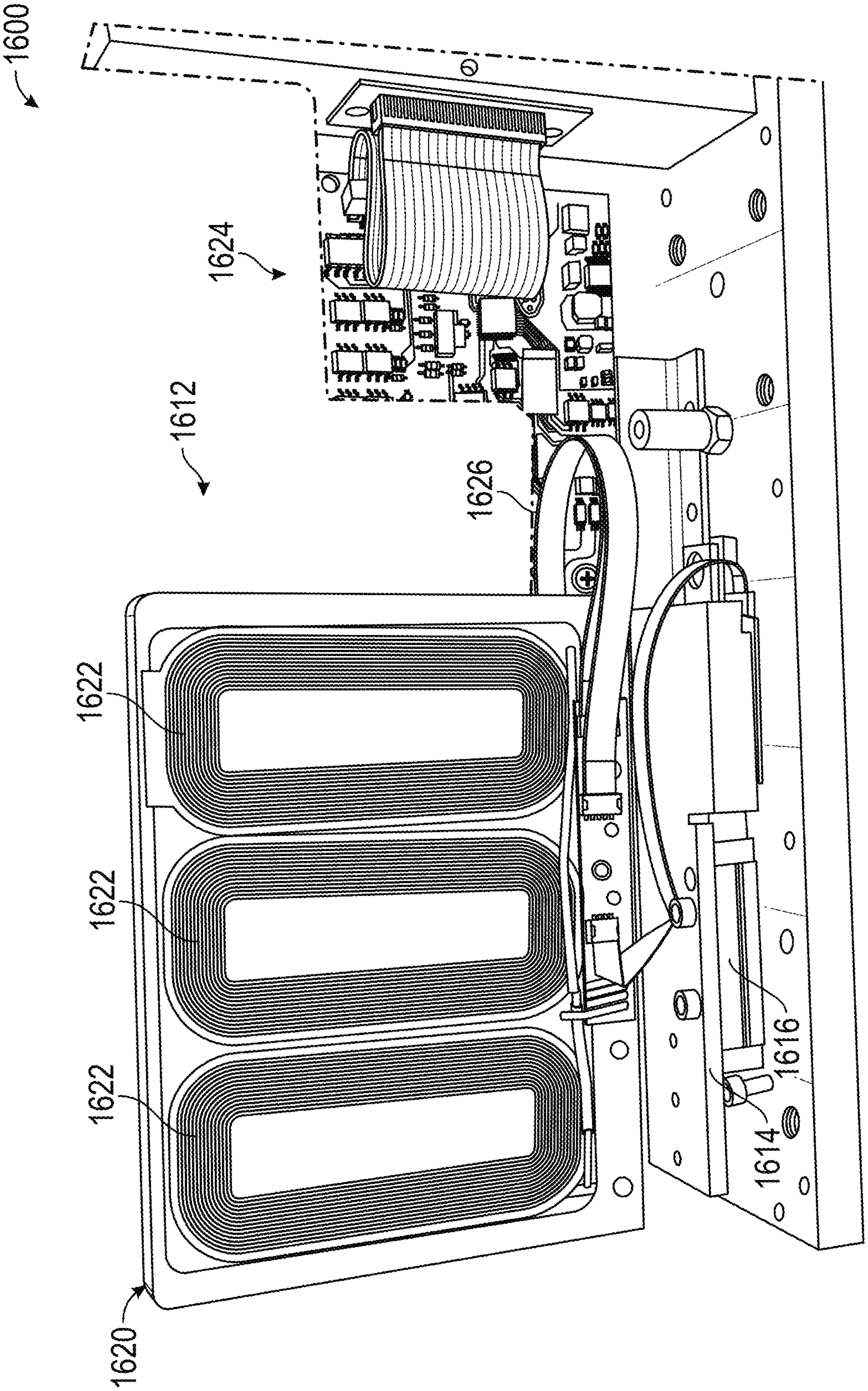
FIGS. 16-19 collectively illustrate an alternate embodiment of a piston base assembly for a moving printed coil actuator in a accordance with the disclosure.
Figure 17:
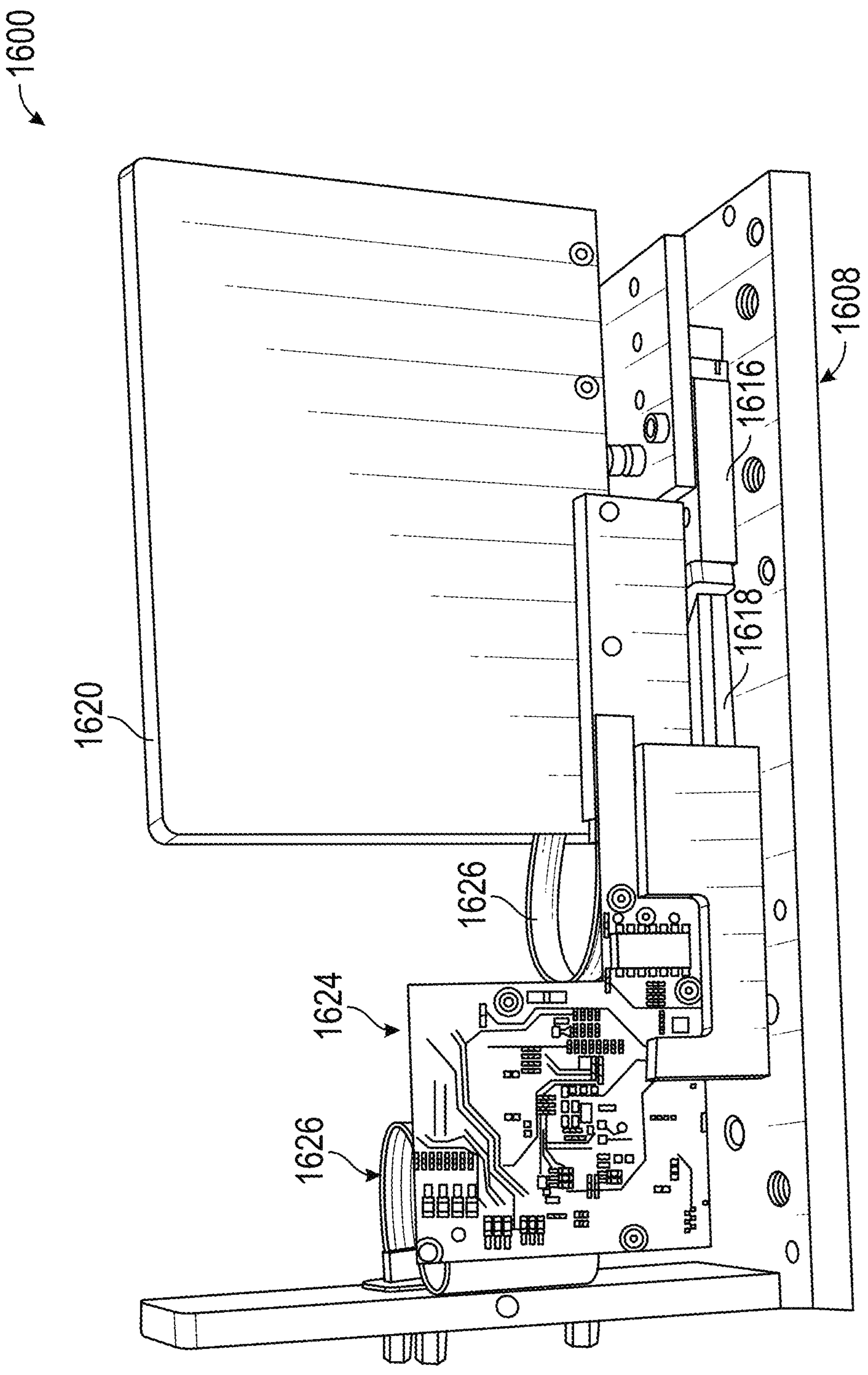
Figure 18:
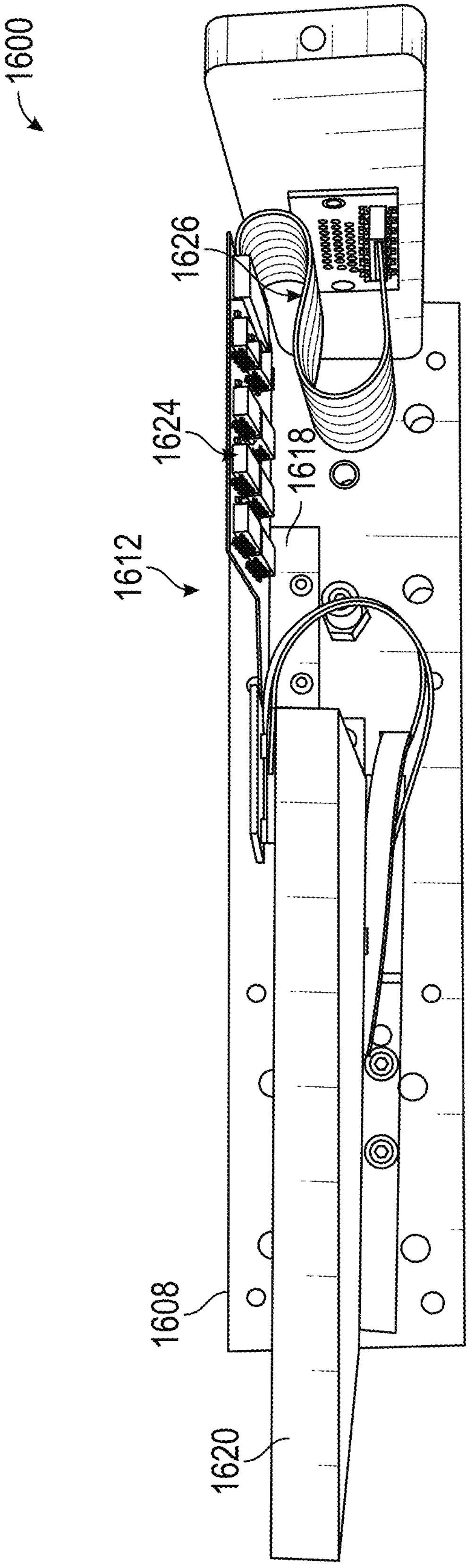
Figure 19:
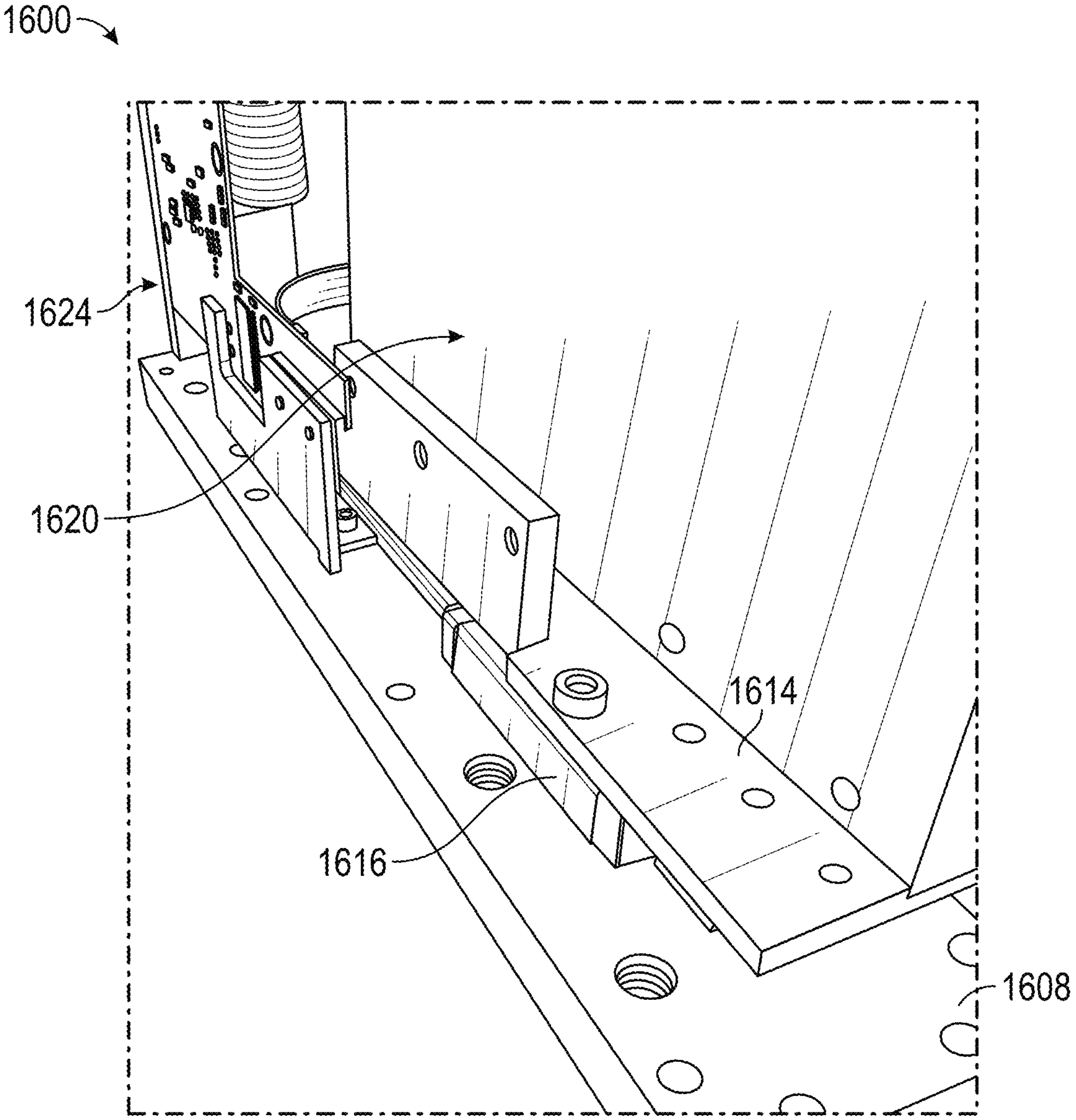

FIGS. 16-19 collectively illustrate an alternate embodiment of a piston base assembly 1600 for a moving printed coil actuator in a accordance with the disclosure. Specifically, FIGS. 16 and 17 are side perspective views of the piston base assembly 1600. FIG. 18 is a top view of the piston base assembly 1600 and FIG. 19 is a front perspective view of the piston base assembly 1600. The piston base assembly 1600 includes a piston assembly 1612 attached to a base plate 1608. The piston assembly 1612 includes a piston element 1614 attached to a linear guide 1616. A shaft (not shown) may be supported by and extend from piston element 1614. The linear guide 1616 is slidably mounted on a rail 1618 attached to the base plate 1608, which enables the piston assembly 1612 and its shaft to move back and forth along a longitudinal axis of the actuator parallel to the rail 1618.

A first multi-layer printed circuit board 1620, which is comprised of 12 layers and defines an arrangement of multi-layer printed coils 1622, is mounted on the piston element 1614. A second multi-layer printed circuit board 1624 defining a controller may be mounted on the base plate 1608. In other embodiments the arrangement of multi-layer printed coils 1622 and the controller may be defined in layers of a single multi-layer printed circuit board attached to the piston element 1614. In the embodiment of FIGS. 16-19 the first multi-layer printed circuit board 1620 and the second multi-layer printed circuit board 1624 are connected to opposite ends of a flex cable 1626. In this way the controller defined by the second multi-layer printed circuit board 1624 may be electrically connected to the arrangement of multi-layer printed coils 1622 defined by the first multi-layer printed circuit board 1620.

Various changes and modifications to the present disclosure will become apparent to those skilled in the art. Such changes and modifications are to be understood as being included within the scope of the present disclosure. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to", or other like phrases in some instances shall not be read to mean that the narrower case is intended or required in instances where such broadening phrases may be absent.

The word “exemplary” is used herein to mean “serving as an example or illustration.” Any aspect or design described herein as “exemplary” is not necessarily to be construed as preferred or advantageous over other aspects or designs.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented. Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

In conclusion, the present invention provides, among other things, reduced-diameter linear actuators and reduced-cost methods of manufacturing those actuators. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosure as expressed in the claims.

What is claimed is:

1. A linear actuator, comprising:

an actuator housing including a magnet housing having first and second planar sides, a front plate and a rear plate respectively arranged at a front end and a rear end of the magnet housing, and a base plate covering a channel defined by the magnet housing, the channel extending between the front end and the rear end of the magnet housing;

a first plurality of magnets secured to the first planar side;

a second plurality of magnets secured to the second planar side;

a linear guide slidably secured to an inner surface of the base plate; and a piston assembly having a piston element attached to the linear guide, the piston assembly being positioned at least partially within the channel and including:

a shaft extending from the piston element, a printed circuit board attached to the piston element, the printed circuit board defining a controller and a printed coil assembly wherein the printed coil assembly includes a plurality of printed coils wherein ones of the printed coils are positioned between the first plurality of magnets and the second plurality of magnets during operation of the linear actuator, a flex cable electrically connected to the printed circuit board;

wherein the piston assembly is disposed to move linearly during operation of the linear actuator.

2. The linear actuator of claim 1 wherein the printed circuit board is a multi-layer printed circuit board and wherein each of the printed coils includes multiple coil traces where each of the multiple coil traces are printed on a respective one of multiple layers of the multi-layer printed circuit board.

3. The linear actuator of claim 2 wherein the printed coil assembly further includes an encoder read head defined on the multi-layer printed circuit board.

4. The linear actuator of claim 1 wherein the printed circuit board is a multi-layer printed circuit board and wherein each of the printed coils includes multiple coil traces where each of the multiple coil traces are printed on a respective one of multiple layers of the multi-layer circuit board.

5. The linear actuator of claim 4 wherein the multi-layer printed circuit board further defines an encoder read head.

6. The linear actuator of claim 1 wherein the printed coil assembly includes a first coil termination connected to a first of plurality of the printed coils and a second coil termination connected to a last of the plurality of printed coils and wherein the flex cable has first and second leads respectively connected to the first coil termination and the second coil termination.

* * * * *